(12) United States Patent
Van Nuffel et al.

(10) Patent No.: US 12,473,414 B2
(45) Date of Patent: Nov. 18, 2025

(54) FOAMS AND METHOD OF FORMING FOAMS OF IONOMERS OF COPOLYMERS OF VINYLIDENE AROMATIC MONOMER AND UNSATURATED COMPOUNDS WITH ACID GROUPS

(71) Applicant: TRINSEO EUROPE GMBH, Horgen (CH)

(72) Inventors: Claude T. E. Van Nuffel, Oostakker (BE); Abidin Balan, Breda (NL); Luc Bosiers, Edegem (BE)

(73) Assignee: TRINSEO EUROPE GMBH, Pfaeffikon (CH)

( * ) Notice: Subject to any disclaimer, the term of this patent is extended or adjusted under 35 U.S.C. 154(b) by 863 days.

(21) Appl. No.: 17/297,679

(22) PCT Filed: Dec. 3, 2019

(86) PCT No.: PCT/EP2019/083442
§ 371 (c)(1),
(2) Date: May 27, 2021

(87) PCT Pub. No.: WO2020/115025
PCT Pub. Date: Jun. 11, 2020

(65) Prior Publication Data
US 2022/0010087 A1  Jan. 13, 2022

Related U.S. Application Data

(60) Provisional application No. 62/774,510, filed on Dec. 3, 2018.

(30) Foreign Application Priority Data

Sep. 25, 2019 (EP) ..................................... 19199497

(51) Int. Cl.
| | |
|---|---|
| *C08J 9/08* | (2006.01) |
| *C08F 212/08* | (2006.01) |
| *C08F 220/06* | (2006.01) |
| *C08J 9/00* | (2006.01) |
| *C08J 9/12* | (2006.01) |
| *C08L 25/14* | (2006.01) |

(52) U.S. Cl.
CPC .............. *C08J 9/08* (2013.01); *C08F 212/08* (2013.01); *C08F 220/06* (2013.01); *C08J 9/0061* (2013.01); *C08J 9/122* (2013.01); *C08L 25/14* (2013.01); *C08F 2810/20* (2013.01); *C08J 2201/03* (2013.01); *C08J 2203/02* (2013.01); *C08J 2203/06* (2013.01); *C08J 2203/184* (2013.01); *C08L 2203/14* (2013.01); *C08L 2205/025* (2013.01); *C08L 2312/00* (2013.01)

(58) Field of Classification Search
CPC .. C08F 212/08; C08F 220/06; C08F 2810/20; C08J 9/0052; C08J 9/0061; C08J 9/08; C08J 9/122; C08J 2201/026; C08J 2201/03; C08J 2203/02; C08J 2203/06; C08J 2203/184; C08J 2325/08; C08K 3/22; C08K 5/098
See application file for complete search history.

(56) References Cited

U.S. PATENT DOCUMENTS

| | | | |
|---|---|---|---|
| 3,322,734 A | 5/1967 | Rees et al. | |
| 4,454,086 A | 6/1984 | Corbett et al. | |
| 4,636,527 A * | 1/1987 | Suh ......................... | C08J 9/127 521/97 |
| 5,670,552 A * | 9/1997 | Gusavage ................ | C08J 9/122 521/154 |
| 5,844,025 A | 12/1998 | Cunkle et al. | |
| 6,613,824 B2 | 9/2003 | Campbell et al. | |
| 8,314,193 B2 | 11/2012 | Reimers et al. | |
| 8,648,148 B2 | 2/2014 | Shields et al. | |

(Continued)

FOREIGN PATENT DOCUMENTS

| | | |
|---|---|---|
| CN | 1184102 A | 6/1998 |
| CN | 1612916 A | 5/2005 |
| CN | 101107278 A | 1/2008 |

(Continued)

OTHER PUBLICATIONS

International Search Report and Written Opinion for co-pending application PCT/EP2019/083442 mailed Mar. 4, 2020 (14 pages).
Notification of the First Office Action in co-pending application CN201980079657.2 dated Nov. 24, 2022 (11 pages).

*Primary Examiner* — John M Cooney
(74) *Attorney, Agent, or Firm* — Young Basile Hanlon & MacFarlane, P.C.

(57) ABSTRACT

A foaming composition useful to make an extruded foam is comprised of comprising a plurality of chains of a copolymer of one or more vinylidene aromatic monomers and one or more unsaturated acids, the copolymer having about 0.01 to about 15.0 percent by weight of the one or more unsaturated acids wherein the acid groups are pendant from the copolymer a metal salt, metal oxide or combination thereof, the metal having a valence of at least 2; and one or more blowing agents. The foaming composition may be made into a foam by heating the foaming composition to a temperature sufficient to melt and ionically crosslink said copolymer which is then extruded through a die forming a foam. The foam is comprised of an ionically crosslinked aforementioned copolymer, wherein the copolymer is crosslinked through ionic bonds between the unsaturated acids and the metal of the metal salt or metal oxide.

10 Claims, No Drawings

(56) References Cited

U.S. PATENT DOCUMENTS

2009/0275716 A1  11/2009  Reimers et al.
2015/0368422 A1  12/2015  Gawryla

FOREIGN PATENT DOCUMENTS

| CN | 101287793 A | 10/2008 |
|---|---|---|
| CN | 102803360 A | 11/2012 |
| EP | 2267065 A1 | 12/2010 |
| JP | H08-143607 A | 6/1996 |
| WO | 2012/078332 A1 | 6/2012 |
| WO | 2012/109130 A1 | 8/2012 |
| WO | 2018/141489 A1 | 8/2018 |

* cited by examiner

FOAMS AND METHOD OF FORMING FOAMS OF IONOMERS OF COPOLYMERS OF VINYLIDENE AROMATIC MONOMER AND UNSATURATED COMPOUNDS WITH ACID GROUPS

This application is a 371 application of International Application No. PCT/EP2019/083442, filed on Dec. 3, 2019, which claims priority from European Patent Application No. EP19199497.9 filed Sep. 25, 2019, and U.S. Provisional Application No. 62/774,510, filed Dec. 3, 2018, the entire disclosures of which are hereby incorporated by reference.

TECHNICAL FIELD

The invention relates to compositions to form foams, foams formed and method to form foams. In particular, the invention relates to foam comprised of a co-polymer of vinylidene substituted aromatic monomers and unsaturated compounds containing acid that are reversibly ionically bonded through the use of a metal salt, metal oxide or combination thereof, wherein the metal has a valence of 2 or more.

BACKGROUND

Extruded polystyrene (XPS) foams have been used for some time in sound and insulation applications. The foams are formed by extruding continuously a heated plastic resin containing a blowing agent through a die, which upon exiting the die expands under, for example, steam or vacuum. XPS foams used in the building industry must have sufficient strength, thermal insulation, heat resistance and solvent resistance. Over the past several years due to environmental concerns the typical HFC blowing agents that realized excellent insulation properties have been phased out resulting in a need for foams with improved insulation properties, which cannot merely be achieved by lowering the density of the foam due to loss of strength. To attempt to address this need polystyrene copolymers having lower thermal conductivities have been employed such as described in DE102004057602 and US20120161061A1. There, however, is still a need for improved insulation while maintaining sufficient strength and heat resistance in the construction industry.

Thus, it would be desirable to provide an extruded polystyrene-based foam having greater strength for a given density (porosity). Likewise, it would be desirable for such a foam to be easily produced in known processes under typical conditions, where the process may realize faster foam line speeds for foams of a given density.

SUMMARY

Applicants have discovered that improved extruded polystyrene based (XPS) foams having improved compressive strength for a given density (porosity) may be made by employing heating a foaming composition comprised of a reversibly cross-linkable copolymer having a vinylidene aromatic monomer wherein the reversibly cross-linkable copolymer undergoes un-crosslinking and crosslinking during the method to form the foam such as when making an extruded polystyrenic (XPS) foam. The cross-linkable polymer may be crosslinked prior to forming the foam or crosslinked in situ during the foaming process. The foam advantageously uncrosslinks at the typical higher temperatures and higher shears used to initially melt blend all the constituents used to make the extruded foam and then crosslinks at lower shears and temperatures used to extrude the melt blend through a die (e.g., ambient conditions). This surprisingly allows for the making of extruded foams having greater strengths at a given density (i.e. same density) or having similar strengths at a lower density (i.e., higher porosity). This allows, for example, the ability to make foams at higher throughputs demonstrating similar densities or strengths as foams made from the same copolymers not displaying the reversible crosslinking.

A first aspect of the invention is a foaming composition comprising:
(a) a plurality of chains of a copolymer of one or more vinylidene aromatic monomers and one or more unsaturated acids, the copolymer having about 0.01 to about 15.0 percent by weight of the one or more unsaturated acids wherein the acid groups are pendant from the copolymer;
(b) a metal salt, metal oxide or combination thereof, the metal having a valence of at least 2; and,
(c) one or more blowing agents.

A second aspect of the invention is a method of forming a foam comprising:
a) heating a foaming composition comprised of a reversibly cross-linkable copolymer having a vinylidene aromatic monomer wherein the reversibly cross-linkable copolymer undergoes un-crosslinking and crosslinking during the method in the presence of a blowing agent and
b) extruding the foaming composition from a higher pressure to a lower pressure to form an extruded foam comprised of the reversibly cross-linkable copolymer that is crosslinked.

A third aspect of the invention is a foam comprised of a copolymer comprising one or more vinylidene aromatic monomers and one or more unsaturated acids, the copolymer having about 0.01 to about 15.0 percent by weight of the one or more unsaturated acids wherein the acid groups are pendant from the copolymer and a metal salt, metal oxide or combination thereof, the metal having a valence of at least 2, wherein the copolymer is crosslinked through ionic bonds between the unsaturated acids and the metal of the metal salt or metal oxide. A foam is as commonly understood in the art meaning a body that is cellular. Cellular (foam) herein means the polymer body has a substantially lowered apparent density compared to the density of the polymer and the body is comprised of cells that are closed or open. Closed cell means that the gas within that cell is isolated from another cell by the polymer walls forming the cell. Open cell means that the gas in that cell is not so restricted and is able to flow to another cell without passing through any polymer cell walls to the atmosphere.

In a particular embodiment, the copolymer comprising one or more vinylidene aromatic monomers and one or more unsaturated acids, the copolymer having about 0.01 to about 15.0 percent by weight of the one or more unsaturated acids wherein the acid groups are pendant from the copolymer and a metal salt, metal oxide or combination thereof is crosslinked and uncrosslinked during the process of forming an extruded foam. It is believed that the uncrosslinking at higher initial shear rates at higher temperature allows for a more pronounce shear thinning and building of strength at lower shears, temperatures and pressures during latter stages of the foam extrusion process. This is believed to allow the realization of the foams with lower density and higher compressive strengths previously described. That is, the reversible crosslinking copolymer realizes desired rheology of during the extrusion process, while realizing greater strength, for a given density allowing, for example, greater thermal insulation while still retaining enough strength for demanding applications such as those in the construction industry.

DETAILED DESCRIPTION

The composition useful to make foam is comprised of a blowing agent, a plurality of chains of a copolymer of one or more vinylidene aromatic monomers and one or more unsaturated acids, the copolymer having about 0.01 to about 15.0 percent by weight of the one or more unsaturated acids wherein the acid groups are pendant from the copolymer and a metal salt, metal oxide or combination thereof, the metal having a valence of at least 2. The copolymer and metal salt or metal oxide is described in U.S. Provisional application 62/774,510, incorporated by reference, and is summarized herein.

The foaming composition is comprised of a blowing agent. The blowing agent may be any suitable physical or chemical blowing agent or combination thereof such as those known in the art. The physical blowing agent may be, for example, any liquid that volatilizes during the formation of a foam such as water, hydrocarbon, chlorinated hydrocarbon, fluorinated hydrocarbon, chlorofluorinated hydrocarbon, or other volatile hydrocarbon such as lower alkanes (e.g., isobutane), ketones, ethers, ester, aldehydes, carboxylic esters, carboxamides or the like or any useful gas such as those present in the atmosphere (oxygen, nitrogen, carbon dioxide, hydrogen, helium and the like) or any combination of the aforementioned. The chemical blowing agent may be any known chemical compound that reacts or decomposes to form a gas at the conditions used to make the foam such as those known in the art. Exemplary chemical blowing agents include sodium bicarbonate and azodicarbonamide as well as those available commercially such as those available under the tradename FOAMAZOL from Bergen International, LLC, East Rutherford, N.J.

Disclosed are compositions comprising a plurality of chains of one or more copolymers of one or more vinylidene aromatic monomers and one or more unsaturated acids, the copolymers having about 0.01 to about 15.0 percent by weight of the one or more unsaturated acids wherein the acid groups are pendant from the copolymer; and a portion of the chains of the copolymer of one or more vinylidene aromatic monomers and one or more unsaturated acids are crosslinked with other chains of the copolymer of one or more vinylidene aromatic monomers and one or more unsaturated acids by i) ionic bonding of anions formed from the pendant acid groups with a metal cation having a valence of 2 or greater or ii) by complexation between pendant acid groups and metal oxides (both (i) and (ii) are referred to herein as ionic bonding). The crosslinks are reversible and the weight average molecular weight of the copolymer of one or more vinylidene aromatic monomers and one or more unsaturated acids may be substantially the same after the crosslinking is reversed as it is before crosslinking. The metal may be one or more of transition metals, post transition metals, metalloids or an alkaline earth metals. The equivalents ratio of metal ions to equivalents of anions formed from pendant acid groups on the copolymer may be from about 200:1, 40:1 or 20:1 or the inverse thereof, 1:20, 1:40 or 1:200. The one or more unsaturated acids may comprise acrylic acid, methacrylic acid, 4-vinyl benzoic acid, maleic acid, fumaric acid, 4-styrene sulfonic acid or mixtures thereof. The copolymer of the one or more vinylidene aromatic monomers and one or more unsaturated acids may contain one or more of (meth)acrylates, unsaturated nitriles and conjugated dienes. The crosslinked composition may further contain one or more polymers or copolymers of one or more vinylidene aromatic monomers blended with the copolymer of one or more vinylidene aromatic monomers and one or more unsaturated acids. The copolymers of one or more vinylidene aromatic monomers may contain one or more of (meth)acrylates, unsaturated nitriles and conjugated dienes.

The crosslinked composition may further comprise one or more impact modifiers, which may be materials commonly referred to as rubbers. The composition may comprise from about 50 to about 99.5 percent by weight of the crosslinked copolymer and from about 0.5 to about 50 percent by weight of the impact modifier based on the weight of the composition. The composition may comprise a continuous matrix of the copolymer and a dispersed phase comprising rubber. The dispersed phase may comprise particles of about 0.05 to about 25.0 microns. The impact modifier may be grafted to the copolymers described herein. The copolymers may be grafted to the impact modifier. The impact modifier that may be grafted to the copolymer or that the copolymer is grafted to may be polybutadiene.

Disclosed is a composition comprising: a) in one part a plurality of chains of a copolymer of one or more vinylidene aromatic monomers and one or more unsaturated acids, the copolymer having about 0.01 to about 15.0 percent by weight of the one or more unsaturated acids wherein the acid groups are pendant from the copolymer; and b) in a separate part one or more metal salts and/or metal oxides of a metal having a valence of 2 or greater. The equivalents ratio of metal salts or metal oxides to equivalents of pendant acid groups on the copolymer may be from about 40:1 to about 1:40. The metal may be one or more of transition metals, post transition metals, metalloids or an alkaline earth metals. The metal may be present as a metal carbonate, metal acetate, metal bicarbonate, metal oxide, metal hydroxide, metal carboxylate, metal acetylacetonate, metal salt of a fatty acid, or mixtures thereof. At least two of the valences of the metals are capable of ionic bonding of anions formed from the pendant acid groups with a metal cation having a valence of 2 or greater or ii) forming complexes between pendant acid groups and metal oxides.

Disclosed is a method for preparing the crosslinked copolymers comprising: contacting one or more copolymers of one or more vinylidene aromatic monomers and one or more unsaturated acids acid groups pendant from the copolymer with one or more metal salts of a metal having a valence of 2 or greater under conditions such that a portion of the chains of the copolymer of one or more vinylidene aromatic monomers and one or more unsaturated acids are crosslinked with other chains of the copolymer of one or more vinylidene aromatic monomers and one or more unsaturated acids by ionic bonding of anions formed from the pendant acid groups with metal cations formed from the metal salts or complexing of the pendant acid groups with metal oxides. The contacting may take place at a temperature of about 180° C. to about 260° C. for any sufficient time period with about 0.5 to about 5 minutes is generally adequate crosslink the copolymer of one or more vinylidene aromatic monomers and one or more unsaturated acids via an ionomeric bond. The equivalents ratio of metal salts or oxides to pendant acid groups on the copolymer may be from about 200:1 to about 1:200 and is preferably from about 40:1 to about 40:1.

Disclosed is a method comprising subjecting the crosslinked copolymers disclosed to a temperature of about 180° C. to about 240° C. under shear and/or contacting the composition with excess equivalents of an acid with respect to the crosslinked anions such that the crosslinks are reversed. The acid contacted with the crosslinked copolymer of one or more vinylidene aromatic monomers and one or more unsaturated acids may be acetic acid, a carboxylic acid corresponding to the formula $CH_3(CH_2)nCOOH$ wherein n is separately in each occurrence from 1 to 20, triflouro acetic acid, or mixtures thereof. The melt viscosity at $0.314\ s^{-1}$ angular frequency is at least 10 percent higher than the same polymer without ionic crosslinking when measured at 200° C.

The melt viscosity at $0.314\ s^{-1}$ angular frequency of the crosslinked polymers may be at least 10 percent higher than the same polymer without crosslinking as disclosed herein when measured at 200° C. and may be at least 20%, 50% or even 100% higher. The cross-linked polymer while having a desirable high viscosity at low shear, the viscosity at high shears (i.e., $628\ s^{-1}$) may be essentially the same (e.g., less than 10% different) than a like uncrosslinked polymer. The crosslinked polymers as a result of their above desirable rheological properties tend to have a higher viscosity ratio (low shear viscosity "$0.314\ s^{-1}$"/higher shear viscosity "$628\ s^{-1}$") than the same polymer without crosslinking. Generally, the viscosity ratio is at least 25, 30 or 40 or even 45 or higher for crosslinked polymer, whereas for the same polymer lacking such, the viscosity ratio tends to be about 20 or less. The crosslinked copolymer of one or more vinylidene aromatic monomers and one or more unsaturated acids may have a melt flow rate at least 10% lower after crosslinking compared to non-crosslinked polymer.

The copolymer without crosslinking may have a z average molecular weight ($M_z$) from about 200 kg/mole to about 800 kg/mole and a $M_w$ from about 100 kg/mole to about 400 kg/mole. The crosslinked copolymers may be used to prepare extruded foams, extruded sheets, blow-molded parts, injection molded parts, thermoformed parts, and the like.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

One or more as used herein means that at least one, or more than one, of the recited components may be used as disclosed. As used herein percent by weight or parts by weight refer to, or are based on, the weight of the compositions unless otherwise specified.

Crosslinked as used herein means that a plurality of the subject copolymers are linked to other subject copolymers through ionic bonds of anions formed from the acid groups from the unsaturated acid with cations formed from the metals or by complexes of the acid groups from the unsaturated acid with metal oxides wherein the metal salts and metal oxides have a valence of at least 2. Crosslinked herein also is understood to mean that the ionic bonds are reversible under typical foam processing conditions (temperature and pressure) as described herein with regard to melt viscosity and solution viscosity. Valence with respect to the metals mean that the metals can form two cationic species that form bonds with anions or can complex with at least two acids. The subject copolymers may be one or more copolymers of one or more vinylidene aromatic monomers and one or more unsaturated compounds containing an acid group. A number of the subject copolymers may have two or more bonds to other subject copolymers. The number of the subject copolymers may have two or more bonds to other subject copolymers and overall crosslinks are chosen to provide the advantageous properties of the crosslinked polymers disclosed herein. As used herein un-crosslinked means that the subject polymers do not have multiple crosslinks such that the resulting polymer composition becomes insoluble in solvents, for instance methylene chloride at 23° C.

The polymers which are crosslinked are based on one or more copolymers of one or more vinylidene aromatic monomers and one or more unsaturated compounds containing one or more acid groups. The copolymers of one or more copolymers of one or more vinylidene aromatic monomers and one or more unsaturated compounds containing one or more acid groups are addition polymers formed by addition polymerization through unsaturated groups. The copolymers are prepared such that the concentration of acid groups is selected such that when reacted with one or more metal salts or metal oxides the copolymers are crosslinked to provide the advantageous properties described herein.

The concentration of the acid groups on the one or more copolymers of one or more vinylidene aromatic monomers and one or more unsaturated compounds containing a an acid group is chosen such that based on the concentration of metal salts or metal oxides which are to be reacted with the copolymers crosslinked polymers are prepared. The concentration of the acid groups on the one or more copolymers of one or more vinylidene aromatic monomers and one or more unsaturated compounds containing acid groups may be about 0.01 percent by weight of the copolymer or greater, about 0.05 percent by weight or greater or about 0.2 percent by weight or greater. The concentration of the acid groups on the one or more copolymers of one or more vinylidene aromatic monomers and one or more unsaturated compounds containing acid groups may be about 15 percent by weight of the copolymer or less, about 10 percent by weight or less or about 5 percent by weight or less.

The equivalents ratio of metal salts to the nucleophilic groups on the copolymers of one or more vinylidene aromatic monomers and one or more unsaturated compounds containing acidic groups is chosen such that when the components are reacted crosslinked polymers are prepared. Equivalents as used in this context means the number of acidic groups available to react with the metals. To form the crosslinked polymers anions based on the acid groups react with the cations formed from the metal salts that have valences of two or greater or the acids complex with metal oxides. The extent of reaction and crosslinking is controlled by the amount of the lowest amount of the acid groups or metal oxide or metal salts present. The amount of acidic groups may be the limiting reactive group. The amount of metal salts or metal oxides groups may be the limiting reactive group. The equivalents ratio of metal salts or metal oxides to acidic groups may be about 1:200 or greater, about 1:40 or greater about 1:20 or greater or 1:10 or greater. The equivalents ratio of metal salts or metal oxides to acidic groups may be about 200:1 or less, about 40:1 or less, about 20:1 or less or 10:1 or less.

The copolymers disclosed herein contain vinylidene substituted aromatic monomers. Vinylidene substituted aromatic monomers comprise vinylidene, alkenyl groups, bonded directly to aromatic structures. The vinylidene substituted aromatic monomers may contain one or more aromatic rings, may contain one or two aromatic rings, or may contain one aromatic ring. The aromatic rings can be unsubstituted or substituted with a substituent that does not interfere with polymerization of the vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. Alkenyl groups comprise straight or branched carbon chains having one or more double bonds, or one double bond. The alkenyl groups useful for the vinylidene substituted aromatic monomers may include those that when bonded to an aromatic ring are capable of polymerization to form copolymers. The alkenyl groups may have 2 to 10 carbon atoms, 2 to 4 carbon atoms or 2 carbon atoms. Exemplary vinylidene substituted aromatic monomers include styrene, alpha methyl styrene, N-phenyl-maleimide and chlorinated styrenes; or alpha-methyl styrene and styrene. The vinylidene substituted aromatic monomers may be mono-vinylidene aromatic monomers, which contain one unsaturated group. Vinylidene aromatic monomers include but are not limited to those described in U.S. Pat. Nos. 4,666,987; 4,572,819 and 4,585,825, which are incorporated herein by reference. The monomer may correspond to the formula:

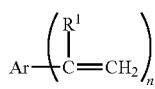

Wherein $R^1$ is separately in each occurrence hydrogen or methyl; and

Ar is separately in each occurrence an aromatic group. Ar may contain one or more aromatic rings, may contain one or two aromatic rings, or may contain one aromatic ring. n is separately in each occurrence 1 to 3, 1 to 2 or 1. The aromatic rings can be unsubstituted or substituted with a substituent that does not interfere with polymerization of the vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. The vinylidene substituted aromatic monomers may be present in the copolymers in a sufficient amount such that the polymer exhibits the advantageous properties associated with polymers of vinylidene substituted aromatic monomers, for instance polystyrene. Among the advantageous properties of polymers of vinylidene substituted monomers include processability, stiffness, and thermal stability. The copolymers of one or more vinylidene aromatic monomers and one or more unsaturated compounds containing a nucleophilic group may contain vinylidene substituted aromatic monomers in an amount of about 85 percent by weight of the copolymers or greater, about 90 percent by weight or greater or about 95 percent by weight or greater. The copolymers of one or more vinylidene aromatic monomers and one or more unsaturated compounds containing an acid group may contain vinylidene substituted aromatic monomers in an amount of about 99.99 percent by weight of the polymerizable compositions or copolymers or less, about 99.97 percent by weight or less or about 99.95 percent by weight or less.

The compositions may contain branching agents commonly used in vinylidene aromatic based polymers. The branching agents may be vinylidene substituted aromatic monomers having 2 or more vinylidene groups. Other branching agents may include other bifunctional and in general multifunctional (functionality>2) monomers, multifunctional initiators and multifunctional chain transfer agents and the like. The branching agents may be present in the polymerizable compositions in an amount of about 0.001 percent by weight of the composition or greater, about 0.002 percent by weight or greater or about 0.003 percent by weight or greater. The branching agents may be present in the polymerizable compositions in an amount of about 0.5 percent by weight of the composition or less, about 0.2 percent by weight or less or about 0.1 percent by weight or less.

The one or more unsaturated compounds containing acid groups may contain any acid group that can form an anion that is capable of reacting with a cation formed from a metal salt or metal oxide to form a crosslink between copolymer chains. Exemplary acid groups include carboxylic acids, unsaturated aromatic acids, sulfonic acids, phosphorous based acids, boronic acids, and the like. The sulfonic acids may be aromatic sulfonic acids. Exemplary acids include acrylic acid, methacrylic acid, 4-vinyl benzoic acid, maleic acid, fumaric acid, 4-styrene sulfonic acid, or mixtures thereof.

The copolymers disclosed herein may further comprise one or more (meth)acrylates. (Meth)acrylate as used herein refers to compounds having a vinyl group bonded to the carbonyl moiety of an alkyl ester wherein the carbon of the vinyl group bonded to the carbonyl group further has a hydrogen or a methyl group bonded thereto. The term (meth) as used in this context refers to compounds having either of a hydrogen or methyl group on the carbon of the vinyl group bonded to the carbonyl group. (Meth)acrylates useful include those that correspond to the formula:

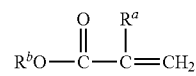

wherein $R^a$ is separately in each occurrence H or $—CH_3$; and $R^b$ may be a $C_1$ to $C_{-30}$ alkyl group or $C_{1-10}$ alkyl group. Examples of the one or more (meth)acrylates include lower alkyl (meth)acrylates, such as methyl (meth)acrylate, ethyl (meth)acrylate, propyl (meth)acrylate, butyl (meth)acrylate, pentyl (meth)(acrylate) and hexyl (meth) acrylate. The one or more (meth)acrylates in the polymerizable composition may be present in sufficient amount to provide the desired properties of the copolymer such as processability, practical toughness, refractive index, environmental stress crack resistance, hydrolytic stability, thermal stability, UV stability, impact resistance, weatherability, and the like. The polymerizable compositions and copolymers disclosed herein contain (meth)acrylates in an amount of about 0 percent by weight of the polymerizable compositions or copolymers or greater, about 1 percent by weight or greater or about 2 percent by weight or greater. The polymerizable compositions and copolymers disclosed herein contain (meth) acrylates in an amount of about 20 percent by weight of the polymerizable compositions or copolymers or less, about 15 percent by weight or less, about 10 percent by weight or less, about 8 percent by weight or less or about 5 percent by weight or less.

The copolymers may further comprise one or more unsaturated nitriles. Unsaturated nitriles include acrylonitrile, methacrylonitrile, ethacrylonitrile, fumaronitrile and mixtures thereof. The unsaturated nitrile may be acrylonitrile. The unsaturated nitriles may be used in the copolymers to enhance the glass transition temperature, transparency, chemical resistance and the like. The copolymers disclosed herein contain one or more unsaturated nitriles in an amount of about 0 percent by weight of the copolymers or greater, about 1 percent by weight or greater or about 2 percent by weight or greater. The copolymers may contain one or more unsaturated nitriles in an amount of about 40 percent by weight of the copolymers or less, about 35 percent by weight or less, about 30 percent by weight or less or about 20 percent by weight or less.

Other vinyl monomers may also be included in the copolymers, in sufficient amount to provide the desired properties as disclosed herein, including conjugated 1,3 dienes (for example butadiene, isoprene, etc.); alpha- or beta-unsaturated monobasic acids and derivatives thereof (for example, acrylic acid, methacrylic acid, etc.); vinyl halides such as vinyl chloride, vinyl bromide; vinylidene chloride, vinylidene bromide; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide (N-PMI); and the like. These additional comonomers can be incorporated in to the composition in several ways including, interpolymerization with the vinylidene substituted aromatic containing copolymer and/or polymerization into polymeric components that can be combined, for example blended with the copolymer. If present, the amount of such comonomers may be equal to or less than about 20 weight percent, equal to or less than about 10 weight percent or equal to about 5 weight percent based on the total weight of the polymeric composition. Such co-monomers may be present in an amount of about 1 percent by weight or greater.

The compositions disclosed may contain impact modifiers. The terms impact modifiers and rubbers are used interchangeably herein. Various impact modifiers may be used in the compositions disclosed; such as diene rubbers, ethylene propylene rubbers, ethylene propylene diene (EPDM) rubbers, ethylene copolymer rubbers, acrylate rubbers, polyisoprene rubbers, silicon rubbers, silicon-acrylate rubbers, polyurethanes, thermoplastic elastomers, halogen containing rubbers, inter-polymers of rubber-forming monomers with other copolymerizable monomers and mixtures thereof. The rubbers may be present in the formulated composition in sufficient amount to provide the desired impact properties to the composition. Desired impact properties include increased izod, charpy, gardner, tensile, falling dart, and the like. The compositions may contain impact modifiers in an amount of about 0.5 percent by weight of the compositions or greater, about 1 percent by weight or greater or about 2 percent by weight or greater. The compositions disclosed herein contain impact modifiers in an amount of about 50 percent by weight of the compositions or less, about 45 percent by weight or less, about 40 percent by weight or less, about 30 percent by weight or less, about 20 percent by weight or less or about 10 percent by weight or less. The compositions may contain the copolymer in an amount of about 0.5 percent by weight of the compositions or greater. The compositions may contain copolymers in an amount of about 99.5 percent by weight of the compositions or less, 90 percent by weight of the compositions or less, 80 percent by weight of the compositions or less or 50 percent by weight of the compositions or less. Compositions as used in this context are the formulated compositions containing all of the ingredients for the intended use.

The rubbers may be diene rubbers such as polybutadiene, polyisoprene, polypiperylene, polychloroprene, and the like or mixtures of diene rubbers, that is, any rubbery polymers of one or more conjugated 1,3-dienes, such as 1,3-butadiene. Such rubbers include homopolymers of 1,3-butadiene and copolymers of 1,3-butadiene with one or more copolymerizable monomers, such as vinylidene substituted aromatic (styrene). The diene rubber may be the homopolymer of 1,3-butadiene. Exemplary copolymers of 1,3-butadiene are block or tapered block rubbers of at least about 30 weight percent 1,3-butadiene, from about 50 weight percent, from about 70 weight percent, or from about 90 weight percent 1,3-butadiene and up to about 70 weight percent vinylidene substituted aromatic monomer, up to about 50 weight percent, up to about 30 weight percent, or up to about 10 weight percent vinylidene substituted aromatic monomer, weights based on the weight of the 1,3-butadiene copolymer.

The impact modifiers employed may be those polymers and copolymers which exhibit a second order transition temperature, sometimes referred to as the glass transition temperature (Tg), for the diene fragment which is not higher than 0° C. or not higher than −20° C. as determined using conventional techniques, for example ASTM Test Method D 746-52 T. Tg is the temperature or temperature range at which a polymeric material shows an abrupt change in its physical properties, including, for example, mechanical strength. Tg can be determined by differential scanning calorimetry (DSC). The diene rubber may have a weight average molecular weight of at least about 100 kilogram per mole (kg/mole) or a weight average molecular weight of at least about a 300 kg/mole. The diene rubber may have a weight-average molecular weight equal to or less than about 900 kg/mole or a weight average molecular weight equal to or less than 600 kg/mole. The diene rubber may have a solution viscosity of at least 10 centiStokes (cSt) (10 percent (%) solution in styrene) or a solution viscosity of about 30 cSt. The diene rubber may have a solution viscosity equal to or less than about 500 cSt or equal to or less than about 400 cSt. The rubber, with graft and/or occluded polymers if present, is dispersed in the continuous matrix phase as discrete particles. The rubber particles may comprise a range of sizes having a mono-modal, bimodal, or multimodal distribution. The average particle size of a rubber particle, as used herein, will, refer to the volume average diameter. The volume average diameter of a group of particles may be the same as the weight average. The average particle diameter measurement generally includes the polymer grafted to the rubber particles and occlusions of polymer within the particles. Unless otherwise specified, the rubber particle sizes disclosed and claimed herein are determined on a Coulter Multisizer II or II e with the ACCUCOMP™ Software Version 2.01 by the following method: about 3 granules of polymer samples (30-70 mg) are dissolved in 5 milliliters (ml) of Dimethyl Formamide (DMF), using an ultrasonic bath for agitation for approximately 15 to 20 minutes. 10 ml or an electrolyte solution (1 percent of $NH_4SCN$ in DMF) is mixed with 0.2 ml of the sample solution. The coulter measuring stand is used with 20 micrometer Coulter tube and a 1.16 micrometer calibration material. The coincidence level indicator of the apparatus should read between 5 and 10 percent. If the reading is above 10 percent, dilute the sample in a beaker with electrolyte solution, or if it is too low, add more drops of the polymer solution in DMF. The volumetric mean particle size is reported. The average particle size of the rubber particles may be equal to or greater than about 0.05 micrometers (microns) (μm), equal to or greater than about 0.1 micrometers, and about 0.5 micrometers. The average particle size of the rubber particles may be equal to or less than about 10 micrometers, equal to or less than about 5 micrometers, or equal to or less than about 4 micrometers.

The disclosed compositions may also optionally contain one or more additives that are commonly used in compositions of this type. Exemplary additives include: ignition resistant additives, stabilizers, colorants, antioxidants, antistats, silicon oils, flow enhancers, mold releases, etc. Exemplary ignition resistance additives include halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Compounds which stabilize mass polymerized rubber-modified vinylidene substituted aromatic copolymer compositions against degradation caused by, but not limited to heat, light, and oxygen, or a mixture thereof may be used. Fillers and reinforcements may also be present. Exemplary fillers include talc, clay, wollastonite, mica, glass or a mixture thereof.

Such additives and/or fillers may be present in the formulated compositions in an amount about 0.01 percent by weight or greater, about 0.1 percent by weight or greater, about 1 percent by weight or greater, about 2 percent by weight or greater, or about 3 percent by weight or greater based on the weight of the compositions. The additives and/or fillers may be present in an amount of about 40 percent by weight or less, about 30 percent by weight or less, about 20 percent by weight or less, about 15 percent by weight or less, about 10 percent by weight or less, about 5 percent by weight or less based on the weight of the composition. The additives may be present in amounts up to 5 weight percent while fillers may be present in amounts up to 40 weight percent based on the weight of the compositions.

Various techniques for producing the copolymers are disclosed. Examples of these known polymerization processes include bulk, mass-solution, or mass-suspension polymerization, generally known as mass polymerization processes. For a good discussion of how to make monovinylidene aromatic copolymer containing compositions see "Modern Styrenic Polymers" of Series In Polymer Science (Wiley), Ed. John Scheirs and Duane Priddy, ISBN 0 471 497525. Also, for example, U.S. Pat. Nos. 3,660,535; 3,243,481; and 4,239,863, which are incorporated herein by reference. Continuous mass polymerization techniques are advantageously employed in preparing the copolymers. The polymerization may conducted in one or more substantially linear, stratified flow or so-called "plug-flow" type reactors such as described in U.S. Pat. No. 2,727,884, sometimes referred to as multizone plug flow bulk process, which may or may not comprise recirculation of a portion of the partially polymerized product or, alternatively, in a stirred tank reactor wherein the contents of the reactor are essentially uniform throughout, which is generally employed in combination with one or more plug-flow type reactors. The stirred tank reactors can be boiling and/or coil reactors. Such reactors can be used in series. Processes for use of the stirred tank reactors for preparing copolymers are disclosed in *Modern Styrenic Polymers*, Edited by John Schiers and Duane Priddy, Wiley, ISBN 0 471 49752 5, published in 2003, see pp 43-72, relevant portions incorporated herein by reference. A parallel reactor set-up, as in EP 412801, may be used for preparing the copolymers, relevant portions incorporated herein by reference.

Multizone plug flow bulk processes include a series of polymerization vessels (or towers), consecutively connected to each other, providing multiple reaction zones. A mixture of monomers used to prepare the copolymer is formed and then fed into the reaction system. An impact modifier, for example butadiene rubber may be dissolved in the mixture monomers before being fed into the reaction system. The polymerization can be thermally or chemically initiated, and viscosity of the reaction mixture will gradually increase. During the reaction course, where present, the rubber may become grafted with the copolymer and, in the rubber solution, bulk copolymer (referred to also as free copolymer or matrix copolymer or non-grafted copolymer) is also formed. At a point where the free copolymer cannot be "held" in one single, continuous "phase" of rubber solution, it begins to form domains of copolymer dissolved in monomer and solvent. The polymerization mixture now is a two-phase system. As polymerization proceeds, more and more free copolymer is formed, and the rubber phase starts to disperse itself (rubber domains) in the matrix of the ever-growing free copolymer phase. Eventually, the free copolymer becomes a continuous phase. Some copolymer is occluded inside the rubber particles as well. Pre-phase inversion means that the rubber solution is a continuous phase and that no rubber particles are formed, and post phase inversion means that substantially all of the rubber phase has converted to rubber domains and there is a continuous copolymer phase. Following the phase inversion, more matrix copolymer may be formed A feed with a functional monomer such as N-phenyl maleimide that increases the Tg of the matrix and also the heat resistance of the product can be added in one or more location throughout the polymerization process, the location(s) may be the same or different from where the co-monomers are added, for example see U.S. Pat. Nos. 5,412,036 and 5,446,103, which are incorporated herein by reference.

A feed with a functional additive such as ethylene-bisstearamide, dialkyladipates, polydimethylsiloxane, or other lubricants or release agents that increases the processability of the product can be added in one or more location throughout the polymerization, devolatilization and conveying process, the location(s) may be the same or different from where the co-monomers are added.

When a desirable monomer conversion level and a matrix copolymer of desired molecular weight distribution is obtained, where impact modifier is present, the polymerization mixture may then be subjected to conditions sufficient to crosslink the rubber and remove any unreacted monomer and solvent. Such crosslinking and removal of unreacted monomer, as well as removal of diluent or solvent, if employed, and other volatile materials is advantageously conducted employing conventional devolatilization techniques, such as introducing the polymerization mixture into a devolatilizing chamber, flashing off the monomer and other volatiles at elevated temperatures, for example, from 130° C. to 300° C. and/or under vacuum and removing them from the chamber. The polymer may be extruded, and bulk pellets obtained from a pelletizer.

The temperatures at which polymerization is conducted are dependent on a variety of factors including the specific initiator and type and concentration of rubber, comonomers, reactor set-up, and reaction solvent, if any, employed.

Polymerization temperatures from 60° C. to 160° C. may be employed prior to phase inversion with temperatures from 100° C. to 200° C. being employed subsequent to phase inversion. Mass polymerization at such elevated temperatures is continued until the desired conversion of monomers to polymer is obtained. Conversion (percent solids) of from 55 to 90, or 60 to 85, weight percent of the monomers added to the polymerization system to polymer is desired. Percent solids is the ratio of the weight of the solids (for example, rubber plus matrix (co)polymer) to the weight of the reaction mixture (for example, unpolymerized monomer(s)) expressed in percent at any specified time during the polymerization reaction.

A polymer's molecular weight is directly related to the entanglement effects contributing to its rheological and physical properties. The molecular weight of the matrix copolymer produced in the grafting reactor during the production of the rubber-modified vinylidene aromatic substituted copolymer can be adjusted by the addition of a suitable chain transfer agent. Chain transfer agents, or molecular weight regulators, are substances which can undergo atom or group transfer or an addition-elimination. Organic molecules with labile hydrogens and are well known, for example, alpha-methyl styrene dimer, mercaptans or thiols such as n-dodecylmercaptan (nDM) and thioglycolate, disulfides, dithiauram disulfides, monosulfides, halides or halocarbons, common solvents and certain unsaturated compounds such as allyl peroxides, allyl halides, allyl sulfides, and terpenes such as terpinoline. Also transition metal complexes as cobalt(II) porphyrin complexes can be used as transfer agent. Chain transfer agents are added in an amount from about 0.0001 to 10 weight percent based on the weight of the reaction mixture (that is, rubber, monomer(s), and solvent, if any). The chain transfer agent may be added in an amount equal to or greater than about 0.001 weight percent, about 0.002, or about 0.003 weight percent based on the weight of the reaction mixture. The chain transfer agent may be added in an amount equal to or less than about 0.5 weight percent, about 0.2, or about 0.1 weight percent based on the weight of the reaction mixture.

The chain transfer agent may be added all at once in one reactor zone or it may be added in two or more reactor zones. Chain transfer agent may be added before phase inversion, during rubber particle sizing, more may be added after particle sizing to help control the matrix molecular weight, and optionally more may be added later to fine tune the matrix molecular weight/molecular weight distribution. The chain transfer agent may be added at the beginning of the polymerization (in other words, at a time where the percent solids for the reaction mixture is equal to the weight percent rubber) in a first amount equal to or greater than 0.001 weight percent, from about 0.002 and about 0.1 weight percent, or from about 0.003 and about 0.05 weight percent based on the weight of the reaction mixture. The amount of chain transfer agent added later, for example after about 40 percent solids, 30 percent solids, is added in a second amount equal to or less than about 0.7 weight percent, about 0.001 to about 0.6 weight percent, or from about 0.002 to about 0.5 weight percent based on the weight of the reaction mixture. The molecular weight of the matrix copolymer depends on, among other things, how much chain transfer agent is used and when it is added.

The monomers and optionally rubber or rubber precursors in the reaction mixture may be dissolved or dispersed in an inert solvent. Useful solvent families are aromatics, ketones, alkanes. An exemplary solvent is ethyl benzene. The solids level of monomers and rubbers or rubber precursors in the solvent may be chosen to facilitate efficient formation of the copolymer and optionally dispersed rubber in the copolymer. Solids level as used in this context is the amount of the monomers and optionally rubber in the reaction mixture expressed as weight percent. The solids level of monomers and optionally rubber or rubber precursors in the reaction mixture is about 60 percent by weight or greater based on the reaction mixture, is about 65 percent by weight or greater or is about 70 percent by weight or greater. The solids level of monomers and optionally rubber or rubber precursors in the reaction mixture is about 95 percent by weight or less based on the reaction mixture, is about 90 percent by weight or less or is about 85 percent by weight or less.

The residence time of the reaction mixture in the reactors is sufficient to prepare copolymers having the desired molecular weight. The residence time of the reaction mixture in the reactors may be about 1 hour or greater, about 1.5 hours or greater or about 2 hours or greater. The residence time of the reaction mixture in the reactors may be about 10 hours or less, about 9 hours or less or about 8 hours or less. The molecular weight of the copolymer may be about 100 kg/mole or greater, about 120 kg/mole or greater or about 140 kg/mole or greater. The molecular weight of the copolymer may be about 400 kg/mole or less, about 350 kg/mole or less or about 325 kg/mole or less. Molecular weight is determined by gel permeation chromatography (GPC) using polystyrene standards.

The process may be performed in the presence of a radical initiator. Any radical initiator that enhanced the formation of the copolymers may be used. Exemplary classes of initiators include free radical initiators such as peroxide and azo compounds which will accelerate the polymerization of the vinyl aromatic monomer. Exemplary initiators include tertiary butyl peroxyacetate, dibenzoyl peroxide, dilauroyl peroxide, t-butylhydroperoxide, ditertiary-butylperoxide, cumene hydroperoxide, dicumylperoxide, 1,1-bis(tertiary-butylperoxy)-3,3,5-trimethyl-cyclohexane, t-butylperoxy benzoate, 1,1-bis(t-butylperoxy)-cyclohexane, benzoylperoxide, succinoylperoxide and t-butylperoxypivilate, and azo compounds such as azobisisobutyro-nitrile, azobis-2,4-dimethylvaleronitrile, azobiscyclohexanecarbo-nitrile, azobismethyl isolactate and azobiscyanovalerate. Typical amounts are well known in the art and may be used in the disclosed process. The radical initiators may be utilized in a sufficient amount to enhance the polymerization of the monomers to form a copolymer, including increasing the rate of polymerization The radical initiators may be present in an amount of about 0.001 percent by weight or greater based on the weight of the monomers present, about 0.002 percent by weight or greater or about 0.003 percent by weight or greater. The radical initiators may be present in an amount of about 0.1 percent by weight or less based on the weight of the co-monomers present, about 0.08 percent by weight or less or about 0.05 percent by weight or less.

Disclosed is a composition useful for preparing crosslinked copolymers of one or more vinylidene aromatic monomers and one or more unsaturated compounds containing an acid group. The composition comprises: a) in one part a plurality of chains of a copolymer of one or more vinylidene aromatic monomers and one or more unsaturated acids, the copolymer having about 0.01 to about 15.0 percent by weight of the one or more unsaturated acids wherein the acid groups are pendant from the copolymer; and b) in a separate part one or more metal salts and/or metal oxides of a metal having a valence of 2 or greater. The two parts may be kept separate until formation of the crosslinked copolymers of one or more vinylidene aromatic monomers and one or more unsaturated compounds containing one or more acid groups is desired. The formation of the crosslinked copolymers of one or more vinylidene aromatic monomers and one or more unsaturated compounds containing one or more acid groups may take place at a time and place remote from preparation of the copolymers. The crosslinked copolymers may be formed by contacting the components. The components may be contacted under conditions disclosed herein to form the crosslinked copolymers.

The uncontacted composition may include one or more metal salts and/or metal oxides of a metal having a valence of 2 or greater. The metal may be any metal that is capable of forming 2 or more cationic groups that will form an ionic bond with anions formed from the acid group of the copolymer or complexing with two acid groups. The metal may be one or more of transition metals, post transition metals, metalloids or an alkaline earth metals. The metal may be one or more of zinc, zirconium, aluminum, magnesium and calcium. The metal may be one or more of zinc and/or zirconium. The metal may be zinc.

The metal may be used in the form of a salt or oxide. Any salt or oxide may be used which can form cations under reaction conditions for the formation of the crosslinked polymers. The metal may be present in the form of a metal carbonate, metal acetate, metal bicarbonate, metal oxide, metal hydroxide, metal carboxylate, metal acetylacetonate, metal salt of a fatty acid or mixtures thereof. Exemplary metal salts or metal oxides include zinc acetate, zinc oxide, zinc carbonate, zinc hydroxide, zinc stearate, zinc citrate, zirconium acetate, zirconium oxide, aluminum acetate, calcium carbonate, calcium stearate and the like. The metal salt or metal oxide may be present in the reactive composition for forming the crosslinked copolymers in the ratios disclosed hereinbefore. The metal salt or metal oxide may be present in the reactive composition in a sufficient amount to form the crosslinked copolymer. The metal salt or metal oxide may be present in a matrix of a polymer of one or more vinylidene aromatic monomers that can be blended with the copolymer. The metal salt or metal oxide may be present in a master batch which may include an admixture of other components useful for the final use of the composition as disclosed herein, such as a masterbatch. Such master batches may comprise fire retardants, nucleating agents, blowing agents, flow promoters, process aids, fibers, fillers, UV stabilizers, antioxidants, thermal stabilizers, colorants, blends of other polymers, and the like.

The one or more copolymers of one or more vinylidene aromatic monomers and one or more unsaturated compounds containing one or more acid groups may be present in the reactive composition in an amount of about 85 weight percent or greater based on the weight or the reactive composition, about 90 weight percent or greater or about 99 weight percent or greater. The one or more copolymers of one or more vinylidene aromatic monomers and one or more unsaturated compounds containing a nucleophilic group may be present in the reactive composition in an amount of about 99.9 weight percent or less based on the weight or the reactive composition, about 99.8 weight percent or less or about 99.7 weight percent or less.

Disclosed is a method of preparing crosslinked copolymers of one or more vinylidene aromatic monomers and one or more unsaturated compounds containing one or more acid groups. The method may comprise contacting one or more copolymers of one or more vinylidene aromatic monomers and one or more unsaturated acids acid groups pendant from the copolymer with one or more metal salts or metal oxides of a metal having a valence of 2 or greater under conditions such that a portion of the chains of the copolymer of one or more vinylidene aromatic monomers and one or more unsaturated acids are crosslinked with other chains of the copolymer of one or more vinylidene aromatic monomers and one or more unsaturated acids by ionic bonding of anions formed from the pendant acid groups with metal cations formed from the metal salts or by complexing with metal oxides. The amounts of the reactants utilized may be those recited herein before. The conditions of contacting the reactants are chosen such that crosslinked copolymers are formed.

The reactants may be contacted using any method wherein crosslinked copolymers of one or more vinylidene aromatic monomers and one or more unsaturated compounds containing one or more acid groups are prepared. Exemplary methods include melt blending, extrusion, injection molding, foam extrusion, sheet extrusion, and the like. Exemplary methods include melt blending. The temperature for reacting the reactants is selected such that crosslinked copolymers of one or more vinylidene aromatic monomers and one or more unsaturated compounds containing one or more acid groups are prepared. The reactants may be contacted at a temperature of about 180° C. or greater, or about 200° C. or greater, or about 220° C. or greater. The reactants may be contacted at a temperature of about 260° C. or less, or about 250° C. or less, or about 245° C. or less. The contacting time at the stated temperatures is selected such that crosslinked copolymers of one or more vinylidene aromatic monomers and one or more unsaturated compounds containing one or more acid groups are prepared. The contacting time of the reactants may be about 0.1 minutes or greater, about 0.3 minutes or greater or about 0.5 minutes or greater. The contacting time of the reactants may be about 10 minutes or less, about 5.0 minutes or less or about 3.0 minutes or less. Acids may be generated in the process. Any acids present in the reactor may be removed to drive the reaction to completion. Removal of the acids may be performed by any know method. The reactants may be melt blended in an extruder, mixer, and the like. The final form of the products can be pellets, foam boards, sheets, thermoformed articles, injection molded articles, compression molded articles The crosslinks are reversible. The crosslinks may be reversed before the copolymers are used to facilitate processability. The crosslinks may be reversed by subjecting the crosslinked copolymers to a temperature at which the ionic bonds are broken under shear and/or contacting the composition with excess equivalents of an acid with respect to the crosslinked acid groups such that the crosslinks are reversed. The temperature that the crosslinked copolymer may be exposed to break the crosslinks is any temperature at which the crosslinks are broken or reversed. The copolymers may be exposed to a temperature to break the crosslinks of about 180° C. or greater, or about 190° C. or greater, or about 200° C. or greater. The copolymers may be exposed to a temperature to break the crosslinks at a temperature of about 260° C. or less, or about 255° C. or less, or about 250° C. or less. The contacting time at the stated temperatures is selected such that the crosslinks of the copolymers of one or more vinylidene aromatic monomers and one or more unsaturated compounds containing one or more acid groups with metal salts or metal oxides are broken. The contacting time of the reactants may be about 0.1 minutes or greater, about 0.2 minutes or greater or about 0.3 minutes or greater. The contacting time of the reactants may be about 5 minutes or less, about 4 minutes or less or about 3 minutes or less.

The contacting may take place under shear. Shear may be induced in an extruder, mixer or injection molding equipment.

Alternatively, the crosslinks may be reversed by contacting the crosslinked co-polymer with an acid that causes the crosslinks to break and that acid is removed during the process to make a foam such as by boiling away. Exemplary classes of acids include acetic acid, a carboxylic acid corresponding to the formula $CH_3(CH_2)nCOOH$ wherein n is separately in each occurrence from 1 to 20, triflouroacetic acid (TFA), or mixtures thereof. Exemplary acids include acetic acid. Any ratio of acid to the crosslinked copolymer which causes the crosslinks to be broken may be used. The equivalents ratio of acids to the crosslinked anions of the acid groups is about 1:1 or greater, about 5:1 or greater or about 10:1 or greater. The equivalents ratio of acids to the crosslinked anions of the acid groups is about 10000:1 or less, about 5000:1 or less or about 4000:1 or less. The process is performed until the solution viscosity of the copolymer of one or more vinylidene aromatic monomers and one or more unsaturated acids is substantially the same after the crosslinking is reversed as it is before crosslinking or the desired amount of reversed crosslinking is achieved for a particular process. Substantially the same means the solution viscosity of the copolymer that has undergone reversal of crosslinking is within 5 percent of the original molecular weight or within 1 percent of the original molecular weight.

The foam of this invention comprises a copolymer of one or more vinylidene aromatic monomers and one or more unsaturated acids, the copolymer having about 0.01 to about 15.0 percent by weight of the one or more unsaturated acids wherein the acid groups are pendant from the copolymer and a metal salt, metal oxide or combination thereof, the metal having a valence of at least 2, wherein the copolymer is crosslinked through ionic bonds between the unsaturated acids and the metal of the metal salt or metal oxide. Surprisingly, the foams of the present invention may have a lower density while having a compressive strength essentially the same or greater than foams without the chain extended/branched copolymer. A foam having similar density may be made at higher rates while maintaining the compressive strength of a foam lacking the chain extended/branched copolymer.

In an embodiment the composition (i.e., foaming composition) are contacted and heated and extruded to form a foam. In the formation of an extruded foam, the foaming composition is heated to a temperature to melt the copolymers at temperatures described herein and cause the copolymers to crosslink through the metal salt and form the ionically chain extended/branched copolymer, wherein at least during a portion of forming the foam the copolymers are mixed with a blowing agent. The blowing agent may be mixed or contacted with copolymers that are reacting any time prior or during the formation of the foam. For example, depending on the type of blowing agent it may be physically mixed or melt incorporated with the copolymers to form the foaming composition prior to heating and extruding to form the foam. The blowing agent may be introduced during the heating and extruding to form the foam. Likewise, any combination of introducing of the blow agent or agents may be used as well as any combination of blowing agents. Desirably, a combination of blowing agents may be used.

When heating and extruding to form the foam, known processes for making an XPS foam may be employed such as those described in U.S. Pat. Nos. 2,669,751; 3,231,524; 3,391,051; 3,368,008; 3,482,006, 4,420,448 and 5,340,844 may be used. In a particular embodiment to form the foam, the copolymers are melt blended in a first screw extruder connected in series with a second screw extruder with the first extruder being operated at higher pressures and temperatures than the second extruder. In the first extruder, the copolymers are heated to a temperature sufficient to react to form the chain extended/branched copolymer with the temperature generally being from about 150° C. or 170° C. to about 300° C. or 270° C. The temperature may vary within this range along the length of the extruder as is typical in such processes in smoothly transitioning from one extruder to the other and matching the flow rates of each. The second extruder generally has a high length/diameter to slowly cool the melted polymer before exiting the die to form the extruded polymer foam typically in the form a plank. The second extruder as in the first may vary its temperature over its length and typically the temperature ranges from about 200° C. to about 80° C. The pressure in the first extruder typically ranges from about 100 bar to about 250 bar. The pressure in the second extruder typically ranges from about 20 bar to about 200 bar. The time in the extruders may be any useful time in the extruder or extruders and may be from about 2 to 3 minutes or greater, about 5 minutes or greater or about 10 minutes or greater to about 60 minutes or less, about 45 minutes or less or about 30 minutes or less.

When forming the foam other polymers may be melt blended with the foaming composition such as the commonly used to form XPS foams and may include any compatible with the chain extended/branched copolymer that is formed. Examples of other polymers that may be used when forming the foam include any styrenic polymer that is not one of the copolymers of the foaming composition such as polystyrene or substituted polystyrene (e.g., o-methylstyrene, m-methylstyrene, p-methylstyrene, 2,4-dimethylstyrene 2,5-dimethylstyrene, p-tert-butylstyrene, p-chlorostyrene and the like) or copolymers of styrene and a substituted styrene.

Other additives may be included in the composition such as fire retardants, nucleating agents, flow promoters, process aids, fibers, fillers, UV stabilizers, antioxidants, thermal stabilizers, colorants, etc. The nucleating agents may be any useful for nucleating cells when forming the foam and may any suitable ones such as those known in the art. Exemplary nucleating agents include any useful fine particle, inorganic solids such as talc, metal oxides, silicates, polyethylene waxes, and carbon particulates, fibers, nanotubes or the like in any useful amount. The total amount of other additives generally is from about 0.1% to about 10%, 5% or 3% by weight of the foaming composition. The nucleating agent or any other additive may be added at anytime including within the foaming composition prior to be heated or inserted during the heating or extruding when forming the foam.

The foam may have any amount of open or closed cells. For some applications a portion of the cells may be advantageously closed, for example, when absorption of water is deleterious to the function of the final product. Even though open or closed foams may be used, when the application desired benefits from lack of water absorption, the foam is preferably closed cell. For such applications, it is preferred, that at least about 55%, more preferably at least about 60%, even more preferably at least about 75% and most preferably at least about 90% of the cells of the foam are closed cells.

Generally, the foam may have a density from about 16 kg/m3 to about 100 kg/m3 or more. The foam density, typically, is selected depending on the particular application, for example, for an exterior building façade or insulating panel, the density is typically at least about 24 kg/m3 to about 64 kg/m3. The cells of the foam may have an average size (largest dimension) of from about 0.05 to about 5.0 mm, especially from about 0.1 to about 3.0 mm, as measured by ASTM D-3576-98.

Illustrative Embodiments

The following embodiment are provided to illustrate the invention but are not otherwise intended to limit the scope thereof. The invention encompasses and contemplates any and all combinations of the following embodiments including those encompassed in the claims.
1. A foaming composition comprising:
   a) in one part a plurality of chains of a copolymer of one or more vinylidene aromatic monomers and one or more unsaturated acids, the copolymer having about 0.01 to about 15.0 percent by weight of the one or more unsaturated acids wherein the acid groups are pendant from the copolymer;
   b) in a separate part one or more metal salts and/or metal oxides of a metal having a valence of 2 or greater; and,
   c) one or more blowing agents.
2. The composition of embodiment 1 wherein the equivalents ratio of metal salts or metal oxides to equivalents of pendant acid groups on the copolymer is from about 200:1 to about 1:200.
3. The foaming composition according any one of embodiments 1 or 2 wherein the metal is one or more of transition metals, post transition metals, metalloids or an alkaline earth metals.
4. The foaming composition according to any one of the preceding embodiments wherein the metal is one or more of zinc, zirconium, aluminum, magnesium and calcium.
5. The foaming composition according to any one of the preceding embodiments wherein the metal is one or more of zinc and zirconium.
6. The foaming composition according to any one of the preceding embodiments wherein the metal is present as a metal carbonate, metal stearate, metal acetate, metal bicarbonate, metal oxide, metal hydroxide, metal carboxylate, metal acetylacetonate, or metal salt of a fatty acid or mixtures thereof.
7. The foaming composition according to any one of the preceding embodiments wherein the uncrosslinked copolymer which contains acid groups exhibits an $M_z$ of from about 200 kg/mole to about 800 kg/mole and an $M_w$ of from about 100 kg/mole to about 400 kg/mole.
8. The foaming composition according to any one of the preceding embodiments wherein the copolymer of the one or more vinylidene aromatic monomers and one or more unsaturated acids may further comprise one or more (meth)acrylates, unsaturated nitriles or conjugated dienes.
9. The foaming composition according to any one of the preceding embodiments wherein the one or more unsaturated acids comprise carboxylic acids, unsaturated aromatic acids, sulfonic acids, phosphorous based acids, boronic acids, or mixtures thereof.
10. The foaming composition according to any one of the preceding embodiments comprising one or more impact modifiers.
11. The foaming composition according to any of the preceding embodiments comprising from about 20 to about 99.5 percent by weight of the copolymer and from about 0.5 to about 50 percent by weight of the impact modifier based on the weight of the composition.
12. The foaming composition according to Embodiments 10 or 11 which comprises a continuous matrix containing the copolymer and a dispersed phase comprising an impact modifier.
13. The foaming composition according to any one of Embodiments 10 to 12 wherein the dispersed phase comprises particles of about 0.05 to about 25.0 microns.
14. The foaming composition according to any one of Embodiments 10 to 13 wherein the part containing the metal salt and/or metal oxide may further comprise one or more of polymers comprising vinylidene aromatic monomers having no acid groups, flame retardants, fillers, process aids, mineral oil, nucleating agents, blowing agents, thermal stabilizers, antioxidants, colorants, UV absorbers/stabilizers and thermal attenuators.
15. The foaming composition according to any of the preceding embodiments containing from about 0.1 to about 15.0 weight percent of one or more blowing agents; wherein weight percent is based on the weight of the composition.
16. The foaming composition according to any of the preceding embodiments containing one or more nucleating agents.
17. The foaming composition according to any of the preceding embodiments containing the one or more nucleating agents in an amount of about 0.1 to about 10 percent by weight of the composition.
18. A foam having a continuous matrix that defines cells wherein the continuous matrix comprises a one or more copolymers of one or more vinylidene aromatic monomers and one or more unsaturated acids, the copolymer having about 0.01 to about 15.0 percent by weight of the one or more unsaturated acids wherein the acid groups are pendant from the copolymer;
   wherein the copolymers are crosslinked through the acids by i) ionic bonding of anions formed from the pendant acid groups with a metal cation having a valence of 2 or greater or ii) complexation between pendant acid groups and metal oxides.
19. The foam according to Embodiment 18 wherein the crosslinks are reversible and the weight average molecular weight of the copolymer of one or more vinylidene aromatic monomers and one or more unsaturated acids is substantially the same after the crosslinking is reversed as it is before crosslinking.
20. The foam according to Embodiment 18 or 19 wherein the melt viscosity at 0.314 $s^{-1}$ angular frequency of the crosslinked copolymer is at least 10 percent higher than the without ionic crosslinking when measured at 200° C.
21. The foam according to any one of embodiments 18 to 20 wherein the metal is one or more of transition metals, post transition metals, metalloids or an alkaline earth metals.
22. The foam according to any one of embodiments 18 to 21 wherein the metal is one or more of zinc, zirconium, aluminum, magnesium and calcium.
23. The foam to any one of embodiments 18 to 22 wherein the metal is one or more of zinc and zirconium.
24. The foam according to any one of embodiments 18 to 23 wherein the solution viscosity, measured at 23° C. at 10 weight percent in toluene, of the crosslinked copolymer is at least 100 percent greater than the solution viscosity of the uncrosslinked copolymers.
25. The foam according to any one of embodiments 18 to 24 wherein the copolymer without ionic crosslinking has $M_z$ is from about 200 kg/mole to about 800 kg/mole and the $M_w$ is from about 100 kg/mole to about 400 kg/mole.
26. The foam according to any one of embodiments 18 to 25 wherein the copolymer of the one or more vinylidene aromatic monomers and one or more unsaturated acids may further comprise one or more (meth)acrylates, unsaturated nitriles or conjugated dienes.

27. The foam according to any one of embodiments 18 to 26 wherein the equivalents ratio of metal ions to equivalents of anions formed from pendant acid groups on the copolymer is from about 40:1 to about 1:40.

28. The foam according to any one of embodiments 18 to 27 wherein the one or more unsaturated acids comprise carboxylic acids, unsaturated aromatic acids, sulfonic acids, phosphorous based acids, boronic acids, or mixtures thereof.

29. The foam according to any one of embodiments 18 to 28 comprising one or more impact modifiers.

30. The foam according to any of embodiments 18 to 29 comprising from about 20 to about 99.5 percent by weight of the crosslinked copolymer and from about 0.5 to about 50 percent by weight of the impact modifier based on the weight of the composition.

31. The foam according to Embodiments 29 or 30 which comprises a continuous phase containing the cross-linked copolymer and a dispersed phase comprising an impact modifier.

32. The foam according to any one of Embodiments 29 to 31 wherein the dispersed phase comprises particles of about 0.05 to about 25.0 microns.

33. The foam according to any one of embodiments 18 to 32 wherein the copolymer has a melt flow rate at least 10% lower after crosslinking compared to the non-crosslinked polymer as measured according to ASTM D-1238 (condition 200° C./5 kg).

31. The foam according to any one of Embodiments 18 to 30 wherein the foam is an extruded foam sheet.

32. The foam according to any one of Embodiments 18 to 31 wherein the foam is a closed cell foam.

33. The foam according to any one of Embodiments 18 to 31 wherein the foam is an open cell foam.

34. The foam according to any one of Embodiments 18 to 33 wherein the polymer matrix contains a coloring agent.

35. The composition according to any one of Embodiments 18 to 34 wherein the polymer matrix contains a flame retardant.

36. The foam according to any one of Embodiments 18 to 35 wherein the polymer matrix contains one or more ultraviolet light stabilizers.

37. The foam according to Embodiment 32 wherein the closed cells contain the residue of one or more blowing agents.

38. The foam according to any one of Embodiments to 37 wherein the polymer matrix contains one or more nucleating agents.

39. A method of preparing a foam comprising:
   a) heating a foaming composition comprising a plurality of chains of a copolymer of one or more vinylidene aromatic monomers and one or more unsaturated acids, the copolymer having about 0.01 to about 15.0 percent by weight of the one or more unsaturated acids wherein the acid groups are pendant from the copolymer, one or more metal salts and/or metal oxides of a metal having a valence of 2 or greater, and one or more blowing agents, wherein one or more copolymers of one or more vinylidene aromatic monomers and one or more unsaturated acids acid groups pendant from the copolymer with one or more metal salts or metal oxides of a metal having a valence of 2 or greater under conditions such that a portion of the chains of the copolymer of one or more vinylidene aromatic monomers and one or more unsaturated acids are crosslinked with other chains of the copolymer of one or more vinylidene aromatic monomers and one or more unsaturated acids by ionic bonding of anions formed from the pendant acid groups with metal cations formed from the metal salts or metal oxides under pressures where the one or more blowing agents of the foaming composition does not foam and
   b) extruding the foaming composition of step (a) into an environment at which the copolymer forms a foam.

40. The method of embodiment 39 wherein the contacting of the one or more copolymers of one or more vinylidene aromatic monomers and one or more unsaturated acids acid groups pendant from the copolymer with one or more metal salts or metal oxides of a metal having a valence of 2 or greater occurs at a temperature of about 80° C. to about 270° C. for a time period of about 0.5 to about 60 minutes wherein the copolymer of one or more vinylidene aromatic monomers and one or more unsaturated acids are crosslinked with other chains of the copolymer of one or more vinylidene aromatic monomers and one or more unsaturated carboxylic acids by i) ionic bonding of anions formed from the pendant acid groups with a metal cation having a valence of 2 or greater or ii) complexation between pendant acid groups and metal oxides.

41. The method of any one of embodiments 39 or 40 wherein the equivalents ratio of metal salts to equivalents of pendant acid groups on the copolymer is from about 200:1 to about 1:200.

42. The method of any one of embodiments 39 to 41 wherein the metal is one or more of transition metals, post transition metals, metalloids or an alkaline earth metals.

43. The method according to any one of embodiments 39 to 42 wherein the metal is one or more of zinc, zirconium, aluminum, magnesium and calcium.

44. The method according to any one of embodiments 39 to 43 wherein the metal is one or more of zinc and zirconium.

45. The method according to any one of embodiments 39 to 44 wherein the metal is present as a metal carbonate, metal acetate, metal stearate, metal bicarbonate, metal oxide, metal hydroxide, metal carboxylate, metal acetylacetonate, or metal salt of a fatty acid or mixtures thereof.

46. The method according to any one of embodiments 39 to 45 wherein the copolymer before crosslinking exhibits a $M_z$ of from about 200 kg/mole to about 2000 kg/mole and a $M_w$ of from about 100 kg/mole to about 1000 kg/mole.

47. The method according to any one of embodiments 39 to 46 wherein the copolymer of the one or more vinylidene aromatic monomers and one or more unsaturated acids may further comprise one or more (meth)acrylates, unsaturated nitriles or conjugated dienes.

48. The method according to any one of embodiments 39 to 47 wherein the one or more unsaturated acids comprise carboxylic acids, unsaturated aromatic acids, sulfonic acids, phosphorous based acids, boronic acids, or mixtures thereof.

49. The method according to any one of embodiments 39 to 48 comprising one or more impact modifiers.

50. The method of any one of Embodiments 39 to 48 wherein the blowing agent comprises one or more of a physical blowing agent or chemical blowing agent.

51. The method of Embodiment 50, wherein the physical blowing agent is one or more of fluorochlorocarbons, fluorocarbons, hydrocarbons, alcohols, ketones, ethers, water, carbon dioxide, nitrogen, argon, or ammonia.

52. The method of Embodiment 50, wherein the chemical blowing agent is one or more of sodium bicarbonate or azodicarbonamide.

53. The method of any one of Embodiments 39 to 52 wherein the blowing agent is present in an amount of about 0.1 to about 15 percent by weight based on the foaming composition.

53. The method of any one of Embodiments 39 to 53, wherein the foaming composition is comprised of a nucleating agent in an amount greater than 0 weight percent to 10 weight percent by weight of the foaming composition.

EXAMPLES

The following examples are provided to illustrate the invention, but are not intended to limit the scope thereof. All parts and percentages are by weight unless otherwise indicated.

Ingredients:
1. Styrene acrylic acid copolymer having 1% acrylic acid.
2. STYRON™ 650 HF: polystyrene having a melt flow index (MFI) of 46 at 200° C./5 kg (available from Trinseo SA)
3. Zn Acetate MB: (15% Zn Acetate in STYRON™ 660 a polystyrene having an MFI of 7 at 200° C./5 kg available from Trinseo SA, in which Zn acetate powder was mixed with STYRON™ 660 using a twin screw compounding extruder at 200° C.)
4. Flame retardant
5. Blowing Agents: $CO_2$, isobutane, dimethyl ether (DME) fed at the following rates
   a. $CO_2$ between 3.2 kg/hr and 3.5 kg/hr as shown in Table 1
   b. DME at 2.5 kg/hr
   c. Isobutane at 0.50 kg/hr
6. Nucleation Agent: talc
7. Colorants (as masterbatch)

The foams are made using two extruders in series. The first extruder is a twin screw extruder. The second extruder is a single screw extruder. In the first extruder the dosing is 1000 kg/hour and is likewise fed to the second extruder as they are positioned in series. The line speed is 11 meters/minute. The first extruder was run at the following: screw speed—167 rpm; temperature about 190° C.; and specific energy about 0.120 kWh/kg; Residence time about 5 minutes. The pressure was from about 176 bar to about 170 bar.

The second extruder had a screw rpm of about 6.7. The temperature ranged from a temperature at the beginning of the extruder of about 70° C. to 100° C. to cool the extrudate from the first extruder. The temperature is then raised to about 160° C. and then cooled to a temperature ranging from 110° C. to 55° C. at the end of the extruder where the foam is extruded through a die to form the extruded polystyrene foam, with the middle of extruder typically having a temperature of about 89° C. The specific energy was about 0.020 kWh/kg. The pressures ranged from about 153 bar at the beginning of the extruder to about 26 bar at the end of the extruder just prior to exiting from the die orifice.

Comparative Example 1 and each of the Examples 1-5 were made in the manner described above. Comparative Example 1 and Examples 1-5 formulations are shown in Table 1, wherein the amounts are shown as parts by weight except that the $CO_2$ blowing agent is kg/hour. The foam density, compressive strength and complex viscosity at low and high shear as described herein of the Comparative Examples and Example foams are shown in Table 2.

A measurement of molecular weight increase could not be determined directly by GPC, because of the disruption of the ionic bonding when dissolving the polymer to perform the GPC. The ionic bonding is shown by the increase in the low shear complex viscosity. The complex viscosity of the Comparative Example and Examples were measured at 200° C. using an Anton Paar MCR 302 rheometer with air circulated oven using a PP25 measuring cell at a measuring gap of 1.000 mm. Prior to measuring, the samples were dried at 80° C. for two hours. The measurement procedure was as follows. The oven was set at 200° C. and the cell was set at "zero gap" and then set to 20 mm. The sample was added and the gap was changed to the measurement gap stopping at a gap of 1.025 mm to allow for trimming of excessive sample material. Upon reaching the measurement gap of 1.000 mm, the test was commenced with a sweep being performed for 10 minutes at an oscillation of 10 rad/s. Then, the test was performed by sweeping from 628 rad/s down to 0.3 rad/s recording 25 measuring points with a log distribution.

The Examples display an increased viscosity at low shears when measuring complex viscosity (i.e. low frequency) yet have low viscosities at high shears on the order of a like polystyrene composition (i.e., C. Ex. 1) without the ionic cross-linking seen in the present invention. This is particularly shown by the viscosity ratio which increases for all the Examples compared to the Comparative Example 1 while having essentially the same high shear viscosity. The high shear viscosity being essentially the same is believed to be due to the breaking of the ionic bonding at high shears at the measurement temperature, which corresponds to typical initial temperatures to process extruded polystyrene foams.

The compressive strengths were determined after 45 days of aging and determined as per ASTM D1621. From the compressive strength data it is readily apparent that the strength substantially increases beyond any proportionality of density. For example, the density of Ex. 2 compared to C. Ex. 1 increased by about 3%, but the compressive strength increased by almost 17%. This shows that the present invention is able to make higher strength foams at essentially the same density or lower density foams having essentially the same compression strength as foams that are not ionically crosslinked as in the present invention as well as making excellent foams in the absence of a nucleating agent such as talc (see Ex. 5).

TABLE 1

| Ingredients | C. Ex. 1 | Ex. 1 | Ex. 2 | Ex. 3 | Ex. 4 | Ex. 5 |
| --- | --- | --- | --- | --- | --- | --- |
| XZ94003 | 75 | 75 | 75 | 60 | 60 | 60 |
| STYRON 650HF | 20 | 20 | 20 | 35 | 35 | 35 |
| Zn acetate MB | 0 | 2 | 2 | 2 | 2 | 2 |
| Talc | 0.8 | 0.8 | 0.8 | 0.3 | 0.2 | 0.0 |
| $CO_2$ (kg/hr) | 3.2 | 3.2 | 3.5 | 3.5 | 3.5 | 3.5 |

TABLE 2

| Characteristic | C. Ex. 1 | Ex. 1 | Ex. 2 | Ex. 3 | Ex. 4 | Ex. 5 |
| --- | --- | --- | --- | --- | --- | --- |
| Density (kg/m$^3$) | 33.3 | 34.6 | 34.3 | 34.2 | 33.9 | 34.1 |
| Compressive Strength (N/mm2) | 0.45 | 0.55 | 0.57 | 0.58 | 0.58 | 0.57 |
| Viscosity Ratio | 20.1 | 43.8 | 44.0 | 41.9 | 44.0 | 45.2 |
| Viscosity (Pa · s) @ 0.314 rad/s | 2455 | 5600 | 5805 | 5025 | 5505 | 6235 |
| Viscosity (Pa · s) @ 628 rad/s | 122 | 128 | 132 | 120 | 125 | 138 |

What is claimed is:

1. A foaming composition comprising:
   (a) a copolymer of one or more vinylidene aromatic monomers and one or more unsaturated acids, the copolymer having about 0.01 to about 15.0 percent by weight of the one or more unsaturated acids that form acid groups pendant from the copolymer;
   (b) a metal salt, metal oxide or combination thereof, the metal salt and metal oxide each having a metal and the metal having a valence of at least 2; and,
   (c) a blowing agent, wherein the foaming composition, after melt blending the copolymer, the blowing agent and metal salt, metal oxide or combination thereof, forms a crosslinked polymer crosslinked by reversible ionic bonds and the crosslinked polymer has a melt viscosity at $0.314\ s^{-1}$ angular frequency that is at least 10 percent higher than the copolymer when measured at 200° C. and has a viscosity at $628\ s^{-1}$ angular frequency that is essentially the same as the copolymer, and the metal having a valence of 2 is of the metal salt and the metal is present as metal ions to equivalents of anions of the acid groups pendant from the copolymer at an equivalents ratio of 200:1 to 1:200.

2. The foaming composition of claim 1, wherein the foaming composition is an admixture of each of (a), (b) and (c).

3. The foaming composition according to claim 1, wherein the metal is one or more of transition metals, post transition metals, metalloids or an alkaline earth metals.

4. The foaming composition according to claim 1, wherein the metal is one or more of zinc, zirconium, aluminum, magnesium and calcium.

5. The foaming composition according to claim 1, wherein the metal salt is a salt that decomposes into one or more gases at a temperature used to form a foam.

6. The foaming composition according to claim 1, wherein the equivalents ratio is from 40:1 to 1:40.

7. The foaming composition according to claim 6, wherein the equivalents ratio is from 20:1 to 1:20.

8. The foaming composition according to claim 1, wherein the metal is the metal salt of one or more of transition metals, post transition metals, or metalloids.

9. The foaming composition according to claim 8, wherein the metal is one or more of zinc, zirconium, and aluminum.

10. The foaming composition according to claim 1, wherein the foaming composition is in the absence of a branching agent.

* * * * *